US008379607B2

(12) United States Patent
Guarino

(10) Patent No.: US 8,379,607 B2
(45) Date of Patent: *Feb. 19, 2013

(54) ADJUSTING LINK LAYER CONTROL FRAME TO FACILITATE DATA THROUGHPUT

(75) Inventor: Bernard J. Guarino, New Hempstead, NY (US)

(73) Assignee: AT&T Mobility II LLC, Atlanta, GA (US)

( * ) Notice: Subject to any disclaimer, the term of this patent is extended or adjusted under 35 U.S.C. 154(b) by 516 days.

This patent is subject to a terminal disclaimer.

(21) Appl. No.: 12/650,475

(22) Filed: Dec. 30, 2009

(65) Prior Publication Data

US 2010/0103951 A1 Apr. 29, 2010

Related U.S. Application Data

(63) Continuation of application No. 10/965,466, filed on Oct. 13, 2004, now Pat. No. 7,664,079.

(51) Int. Cl.
*H04J 3/00* (2006.01)
*H04B 7/212* (2006.01)

(52) U.S. Cl. .......................................... 370/337; 370/347

(58) Field of Classification Search .................. 370/252, 370/335, 337, 342, 347; 375/341
See application file for complete search history.

(56) References Cited

U.S. PATENT DOCUMENTS 6,208,663 B1 * 3/2001 Schramm et al. ............. 370/465
2005/0002476 A1 * 1/2005 Rached et al. ................ 375/341

* cited by examiner

*Primary Examiner* — Quochien B Vuong
(74) *Attorney, Agent, or Firm* — Moazzam & Associates, LLC

(57) ABSTRACT

A base station subsystem includes logic to change the modulation and coding scheme for radio communications, and logic to communicate with a switching GSM to cause a change in link layer control frame size to reflect the change in modulation and coding scheme.

20 Claims, 4 Drawing Sheets

MONITOR COMMUNICATION CHANNEL CONDITIONS 402

DETECT CHANGE IN COMMUNICATION CHANNEL CONDITIONS 404

DOES CHANGE IN CHANNEL CONDITIONS AFFECT MODULATION AND CODING SCHEME? 406

N

Y

DETERMINE NEW RLC FRAME SIZE 408

DETERMINE NEW LLC FRAME SIZE 410

DONE 412

ADJUSTING LINK LAYER CONTROL FRAME TO FACILITATE DATA THROUGHPUT

This application is a continuation of U.S. patent application Ser. No. 10/965,466, filed Oct. 13, 2004, now U.S. Pat. No. 7,664,079, the content of which is incorporated by reference herein in its entirety.

TECHNICAL FIELD

The present disclosure relates to data communication systems.

BACKGROUND

A popular protocol in use today is the Internet Protocol (IP). IP data packets may be divided into link layer control (LLC) frames, which are then divided into radio layer control (RLC) frames. The RLC frames may be communicated using radio or other wireless technologies. In some situations the RCL frames may be communicated during one or more radio block intervals that are fixed in time length. For example, Time Division Multiple Access (TDMA) technology may employ radio block intervals that are each twenty milliseconds of time.

The LLC frame size is typically fixed, whereas the RLC frames may vary in size according to factors such as the modulation and coding scheme employed.

A problem may arise when communication channel conditions change. A change in channel conditions may lead to a change in modulation and coding scheme, which may in turn affect the number of error correction/redundancy bits provided in RLC framing. Thus, when the fixed-sized LLC frame is encoded into RLC frames, changes to the RLC frame size resulting from the change in modulation and coding scheme may result in wasted space in the fixed-size radio control blocks.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A base station subsystem includes logic to change the modulation and coding scheme for radio communications, and logic to communicate with a switching GSM to cause a change in link layer control frame size to reflect the change in modulation and coding scheme. The link layer control frame may be one of multiple frames representing an Internet Protocol data packet. A change in communication channel conditions may cause the change in modulation and coding scheme. The change in channel conditions may include a change in channel bit error rate and/or a change in channel noise level.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
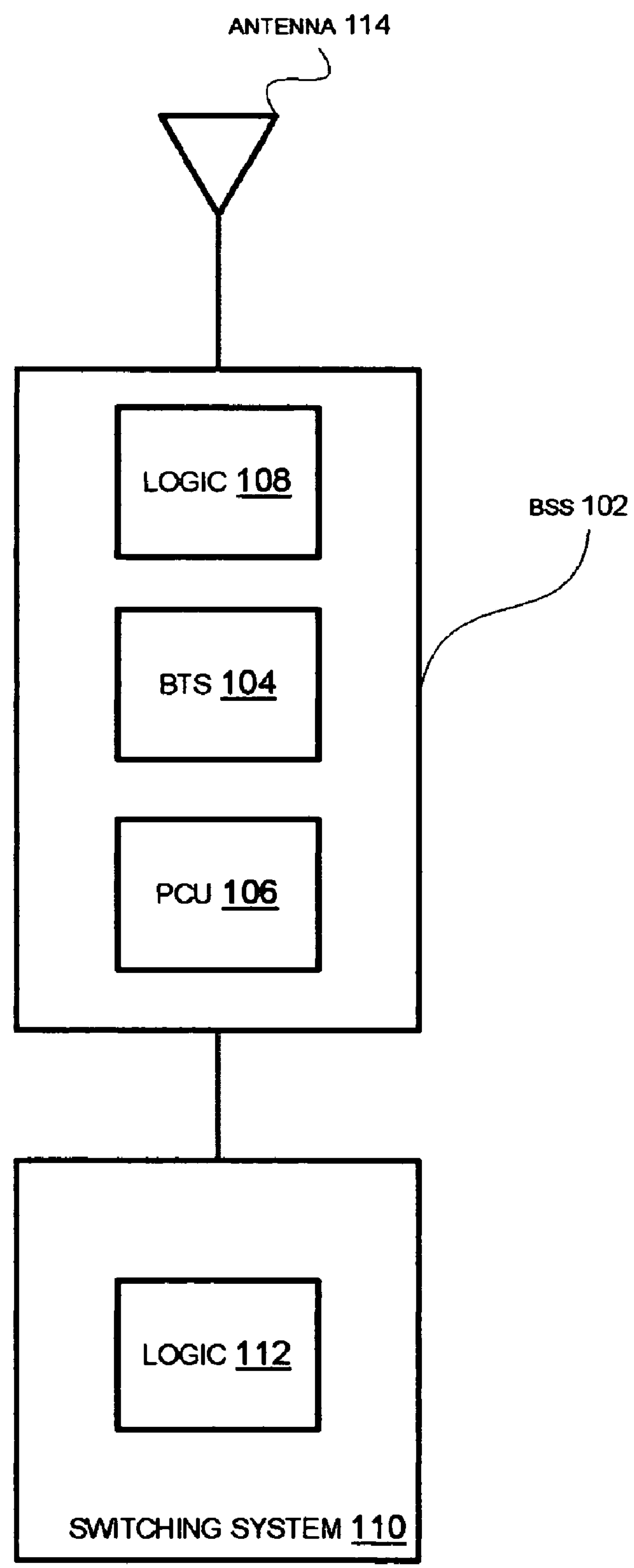
FIG. 1 is a block diagram of an embodiment of a elements of a network to enable wireless communications.

FIG. 1 is a block diagram of an embodiment of elements of a network to enable wireless communications. A radio base station system (BSS) 102 comprises a base transceiver station (BTS) 104, a packet channel unit (PCU) 106, and logic 108. The BSS 102 is coupled to an antenna 114. Herein, logic refers to signals, such as program instructions and/or data, and/or circuits that affect the operations of a device.

The BSS 102 transmits and receives radio signals to and from devices such as cell phones. The BTS 104 interacts with the antenna 114 to transmit and receive these signals. The BTS 104 interacts with the PCU 106 to implement modulation and coding schemes on data communicated to or received from the BTS 104. Thus, the PCU 106 adds radio layer control (RLC) framing to communications to the BTS 104, or removes RLC framing from communications from the BTS 104.

The BSS 102 is coupled to a switching system 110 comprising logic 112. In some embodiments, the switching system 110 may comprise one or more Switching GSM (SGSM) network elements. In other embodiments the switching system 110 may comprise one or more mobile switching centers (MSCs). The switching system 110 provides link layer control (LLC) framing to Internet Protocol (IP) data packets received from elsewhere in the system, and builds IP data packets from LLC frames received from the BSS 102.

Over time, communication channel conditions may vary. For example, the communication channel may become noisier, resulting in an expectation of more errors in received and transmitted frames. In other words, the channel bit error rate may increase. As a second example, incoming packet signal strength may decline. As a third example, channel data throughput may change. Communication channel conditions may also change by improving, for example, by a decrease in channel bit error rate.

Conditions such as these may be detected by the BSS 102. The PCU 106 in the BSS 102 may determine that the coding and modulation scheme should be adjusted, which may result in a different size for the RLC frames.

In some embodiments, for example, in Global System for Mobile Communications (GSM) environments using Time Division Multiple Access (TDMA), the RLC frames are communicated within time intervals known as a radio blocks. One or more complete RLC frames may be transmitted within one radio block. The transmission of an RLC frame will is generally not split over two radio blocks. In some cases, the adjustment of RLC size resulting from the change in modulation and coding scheme may result in significant unused time within some radio blocks as a sequence of RLC packets is communicated. The logic 108 in the BSS 102, potentially by interacting with the PCU 106, may detect that there is significant unused transmission time to be expected within some radio block time intervals resulting from the RLC frame size adjustment to be made to accommodate the new modulation and coding scheme. The logic 108 in the BSS 102 may communicate with logic 112 within the switching system 110, which may result in a change of LLC frame size.

The change in the LLC frame size may result in a changed RLC frame size. The new LLC frame size resulting from the interaction of the BSS 102 with the switching system 110 may result in greater use of transmission capability by RLC frames in the environment of the adjusted modulation and coding scheme.

Figure 2:
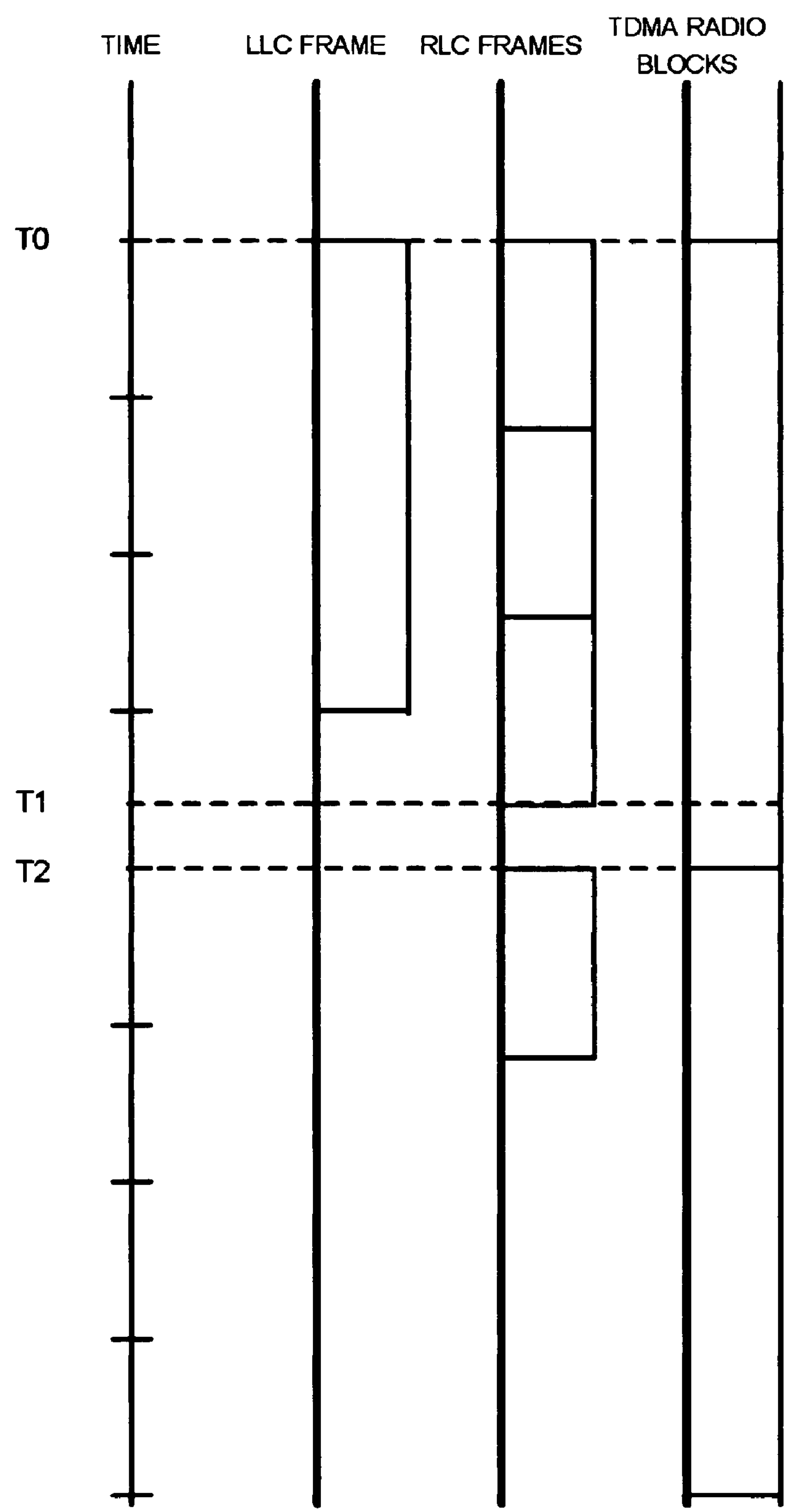
FIG. 2 is a time line diagram of an embodiment of a wireless data framing that may adversely affect data throughput.

FIG. 2 is a time line diagram of an embodiment of wireless data framing that may adversely affect data throughput. In this embodiment each TDMA radio block (the interval between T0 and T2 is one radio block) has a duration of or very close to twenty milliseconds. The LLC frame, without modulation and coding scheme bits applied, has a duration of less than one radio block size (in some situations, the time required to communicate an LLC frame may span multiple radio block intervals). The LLC frame is encoded into multiple (in this embodiment, four) RLC frames.

Due to a change in channel conditions, the number of bits added to provide modulation and coding causes the communication time of the four RLC frames comprising the LLC frame to exceed the duration of one radio block. Because the fourth RLC frame does not fit in the radio block, communication of this frame does not commence until the beginning of the next radio block. Thus, for the period of time between T1 and T2, no data is communicated, leading to reduced data throughput and reduced communication performance.

Figure 3:
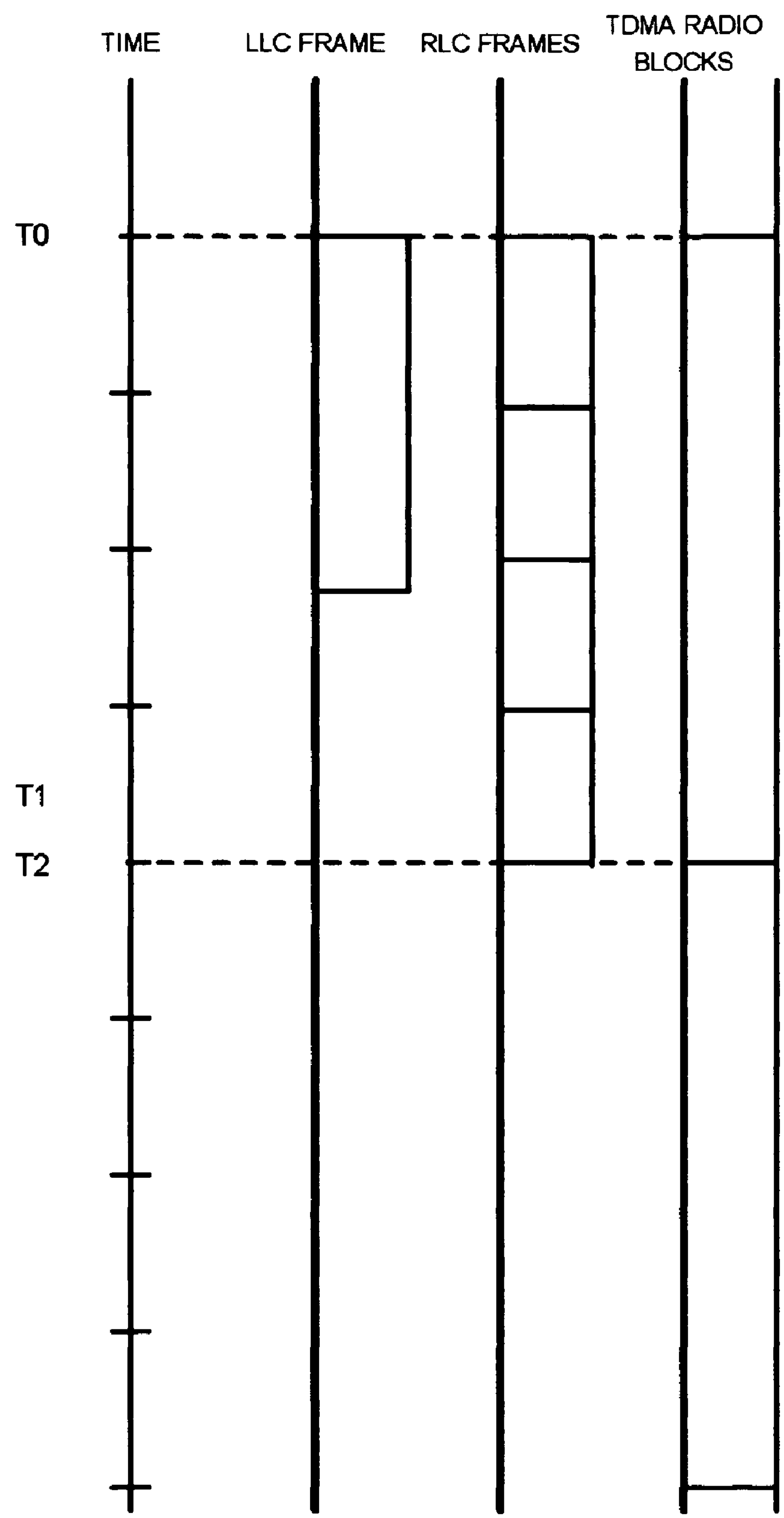
FIG. 3 is a time line diagram of an embodiment of a wireless data framing that may mitigate adverse affects on data throughput.

FIG. 3 is a time line diagram of an embodiment of wireless data framing that may mitigate adverse affects on data throughput.

In response to a change in RLC frame size resulting from a change in modulation and coding scheme, a smaller LLC frame size is determined. The RLC coding of the LLC frame fits into a single radio block interval (the time between T0 and T2 is one radio block interval, as before) without substantial unused communication capacity (communication data space).

Depending upon the situation, the LLC frame may be reduced so that once RLC encoded, it fits efficiently into one or more radio blocks. Or, it may be determined that the LLC frame size is to be increased, thus allowing the RLC encoding to fit efficiently within two or more radio blocks without substantial unused data space. Thus, adjustment of LLC frame size should result in an RLC encoded LLC frame fitting, with little unused data space, into an integral number of radio blocks. Data throughput is improved because substantially all of the radio block intervals are used to communicate data.

The radio subsystem (e.g. the system comprising the BSS 102) may communicate to the switching system 110 a new RLC frame size and/or a calculated new LLC frame size; or the switching subsystem 110 may perform the calculation of new LLC frame size based on information provided by the radio subsystem.

Figure 4:
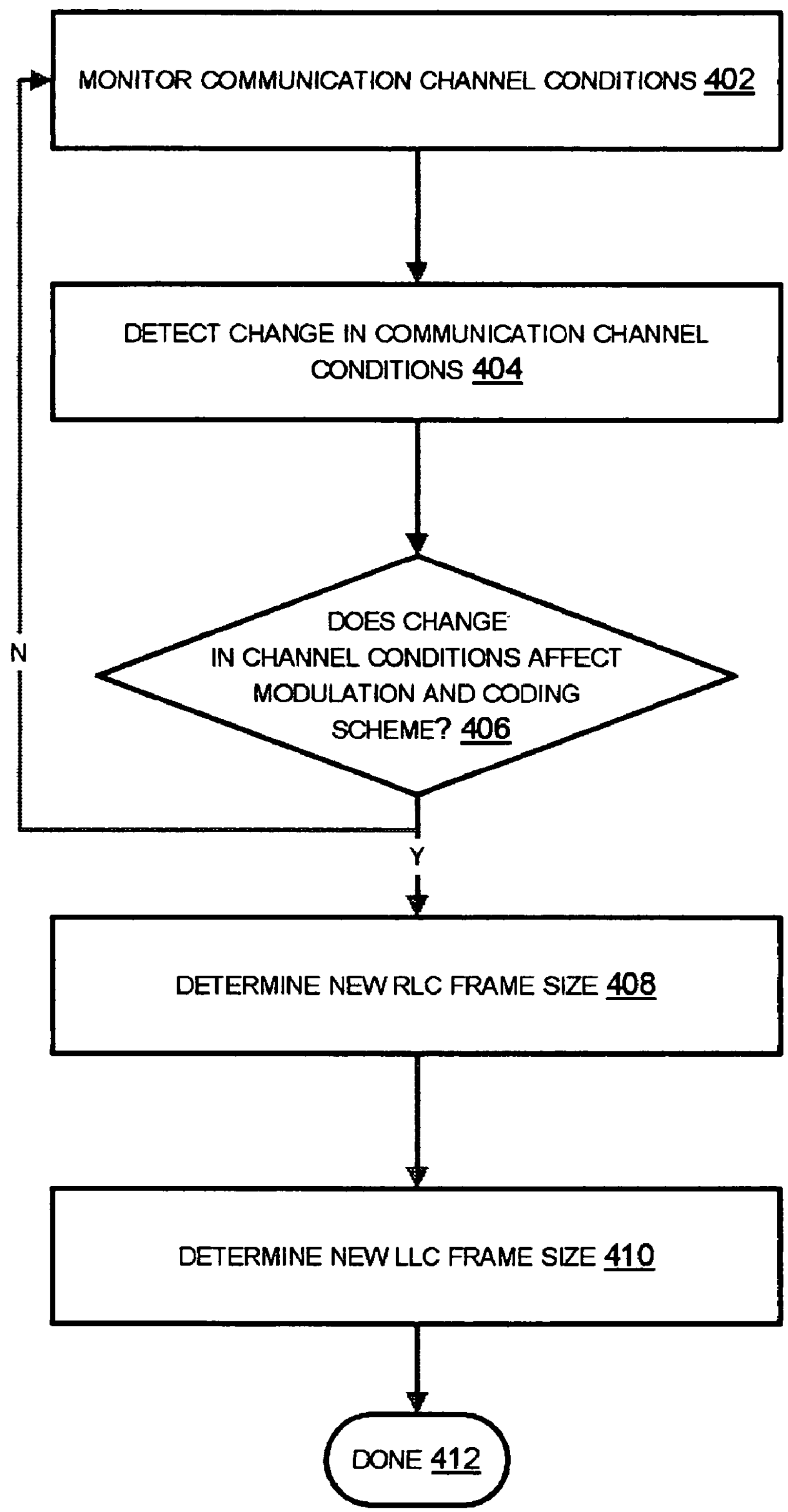
FIG. 4 is a flow chart of an embodiment of a process of adjusting link layer control frame size to mitigate adverse affects on data throughput.

FIG. 4 is a flow chart of an embodiment of a process of adjusting link layer control frame size to mitigate adverse affects on data throughput. At 402 communication channel conditions are monitored. At 404 a change in communication channel conditions is detected. If at 406 it is determined that the change in channel conditions does not affect the modulation and coding scheme, communication channel conditions are further monitored.

Otherwise, a new RLC frame size is determined at 408. The RLC frame size adjustment to reflect the change to the modulation and coding scheme may include providing additional or fewer error correction and-or redundancy bits in the RLC frame. At 410 a new LLC frame size is determined that takes into account the new RLC frame size. To determine the new LLC frame size and implement it, the base station system and the switching system communicate. Information communicated from a base station system to a switching system may comprise the RLC frame size, and/or a LLC frame size, and/or information about a modulation and coding scheme.

At 412 the process concludes.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A base station subsystem for enhanced data throughput, the base station subsystem comprising:

a base transceiver station;

a packet channel unit in communication with the base transceiver station; and a logic in communication with the base transceiver station, the logic for applying a link layer control frame fit into an integral number of radio blocks without substantial unused data space in the radio blocks, thereby maintaining efficiency of overall data throughput, and communicating with a switching system to change the link layer control frame size to reflect the applied link layer control frame, such that data throughput is enhanced.

2. The base station subsystem of claim 1, further comprising an antenna in communication with the base transceiver station.

3. The base station subsystem of claim 1, wherein the logic monitors the communication channel conditions.

4. The base station subsystem of claim 3, wherein the communication channel conditions includes a change in one of channel bit error rate, noise level, and data throughput.

5. The base station subsystem of claim 1, wherein the link layer control frame includes one of multiple frames representing an Internet Protocol data packet.

6. The base station subsystem of claim 1, wherein the logic determines a new radio layer control frame size to accommodate the change in modulation and coding scheme.

7. The base station subsystem of claim 6, wherein the logic communicates at least one of the new radio layer control frame size or a new link layer control frame size to a switching system.

8. A system for enhanced data throughput, the system comprising:

a base station subsystem;

a switching system coupled with the base station subsystem;

a logic on the base station subsystem, the logic for applying a link layer control frame fit into an integral number of radio blocks without substantial unused data space in the radio blocks, thereby maintaining efficiency of overall data throughput, and communicating with the switching system to change the link layer control frame size to reflect the applied link layer control frame, such that data throughput is enhanced.

9. The system of claim 8, wherein the switching system includes a switching GSM network element.

10. The system of claim 8, wherein the switching system includes a mobile switching center.

11. The system of claim 8, wherein the logic monitors the communication channel conditions.

12. The system of claim 8, wherein the link layer control frame includes one of multiple frames representing an Internet Protocol data packet.

13. The system of claim 8, wherein the logic determines a new radio layer control frame size to accommodate the change in modulation and coding scheme.

14. The system of claim 13, wherein the logic communicates at least one of the new radio layer control frame size or a new link layer control frame size to a switching system.

15. A method for enhanced data throughput, the method comprising:

detecting a change in communication channel conditions; and adjusting a link layer control frame size to accommodate the change in communication channel conditions, such that overall data throughput remains efficient despite the change in communication channel conditions; and applying the link layer control frame fit into an integral number of radio blocks without substantial unused data space in the radio blocks.

16. The method of claim 15, further comprising monitoring the communication channel conditions.

17. The method of claim 15, wherein the change in communication channel conditions includes a change in one of channel bit error rate, noise level, and data throughput.

18. The method of claim 15, wherein the link layer control frame includes one of multiple frames representing an Internet Protocol data packet.

19. The method of claim 15, further comprising determining a new radio layer control frame size to accommodate the change in modulation and coding scheme.

20. The method of claim 19, further comprising communicating at least one of the new radio layer control frame size or a new link layer control frame size to a switching system.

* * * * *